(12) United States Patent
Baqai et al.

(10) Patent No.: US 8,398,804 B2
(45) Date of Patent: Mar. 19, 2013

(54) PRESSURE SENSITIVE TEXTILE ADHESIVE

(76) Inventors: Navaid Baqai, Hanover, PA (US); Susan Ganz, Owings Mills, MD (US); Paul Weedlun, Ellicott City, MD (US)

( * ) Notice: Subject to any disclaimer, the term of this patent is extended or adjusted under 35 U.S.C. 154(b) by 142 days.

(21) Appl. No.: 13/004,541

(22) Filed: Jan. 11, 2011

(65) Prior Publication Data

US 2011/0168319 A1      Jul. 14, 2011

Related U.S. Application Data

(63) Continuation-in-part of application No. 12/839,791, filed on Jul. 20, 2010.

(60) Provisional application No. 61/335,703, filed on Jan. 11, 2010.

(51) Int. Cl.
*B29C 65/52* (2006.01)
*B32B 37/26* (2006.01)
*B32B 38/10* (2006.01)
*B32B 7/12* (2006.01)

(52) U.S. Cl. .......... 156/249; 156/289; 156/327

(58) Field of Classification Search ........... 156/230, 156/231, 232, 234, 238, 249, 289, 325, 326, 156/327
See application file for complete search history.

(56) References Cited

U.S. PATENT DOCUMENTS

| | | | | |
|---|---|---|---|---|
| 4,554,324 A | * | 11/1985 | Husman et al. | 525/301 |
| 4,762,888 A | * | 8/1988 | Sun et al. | 525/125 |
| 4,880,678 A | | 11/1989 | Goffi | |
| 5,009,943 A | | 4/1991 | Stahl | |
| 5,635,001 A | | 6/1997 | Mahn, Jr. | |
| 5,762,377 A | * | 6/1998 | Chamberlain | 283/67 |
| 5,990,229 A | * | 11/1999 | Hille et al. | 524/556 |
| 6,582,791 B2 | | 6/2003 | Peloquin et al. | |
| 6,753,050 B1 | | 6/2004 | Dalvey et al. | |
| 6,951,671 B2 | | 10/2005 | Mukherjee et al. | |
| 2003/0023018 A1 | | 1/2003 | Nakano et al. | |

FOREIGN PATENT DOCUMENTS

WO   WO 2007103168 A2   *   9/2007

* cited by examiner

*Primary Examiner* — Sing P Chan
(74) *Attorney, Agent, or Firm* — Ober, Kaler, Grimes & Shriver; Royal W. Craig (57) ABSTRACT

A method of wash-durably bonding integrated textile emblems such as patches, emblems, labels and cut textile parts to another textile article by laminating a pressure sensitive acrylic polymer adhesive to the back surface of the textile emblem. The acrylic polymer adhesive has a storage modulus that is greater than a loss modulus throughout a frequency range of from 0.1885 Hz to 628 Hz where bonding and debonding are expected to occur, and is devoid of any cross linking additives or reagents. The integrated textile emblem with laminated pressure sensitive acrylic polymer adhesive has improved adhesion to low-to-high energy surfaces, is not water soluble and is of adequate thickness to provide a wash-durable textile-to-textile bond capable of seaming or permanently attaching items such as textile panels, appliqué bearing text, numbers, logos and other indicia for the apparel, accessory and other industries.

16 Claims, 4 Drawing Sheets

PRESSURE SENSITIVE TEXTILE ADHESIVE

CROSS REFERENCE TO RELATED APPLICATIONS

The present application derives priority from U.S. Provisional Patent Application 61/335,703 filed on 11 Jan. 2010 which is incorporated herein by reference, and is a continuation-in-part of U.S. application Ser. No. 12/839,791 filed 20 Jul. 2010.

BACKGROUND OF THE INVENTION

1. Field of the Invention

The present invention relates to a pressure sensitive adhesive which can be used to join textile materials together creating a durable wash resistant bond. This adhesive can be used in place of the normally more durable heat activated adhesives such as thermoplastic powders, films or tapes which require heat above room temperatures to flow the adhesives between textile materials which are desired to be joined and then allowed to cool to create a durable bond. The invention described could also replace sewing or stitching of seams to join textile materials together. The product could be utilized to join a broad range of products including but not limited to; garment assembly specifically seams, adhering decorative textile transfers, emblems and appliques that may be applied to a variety of different textile substrates, including apparel, headwear, accessories, textile crafts, luggage and or home furnishings. The particular adhesive is suited for bonding natural fibers such as cotton, silk and cellulosic such as rayon as well as synthetic fiber like polyester and blends thereof.

2. Description of the Background

Apparel and accessory manufacturers use various methods to construct garments and apply decoration and identification to garments and textiles. Common technologies include sewing, heat-sealing tapes or adhesives, sonic welding, direct embroidery and heat activated transfer.

Various methods are used for joining textile products together and for applying decoration and identification to textile materials. Sewing is most commonly used to join fabrics together and for attaching decorative elements. This process is both machinery and labor intensive Direct embroidery is typically performed by a machine that applies stitching of various colors and styles directly onto fabric to create a design. Embroidered designs have a much greater aesthetic value, and stand repeated home and industrial launderings. However, direct embroidery remains a complex, expensive and time-consuming process as well. Emblems are discrete items containing decoration which are manufactured separately and post-applied by various means such as sewing or heat-seal adhesives to textile articles, obviating some of the disadvantages of direct embroidery.

Sonic welding is another method used to apply decoration and identification to garments and textiles. This process requires the creation of unique, expensive special dies for any design to be applied. Sonic welding allows texturing, but also requires chemical compounds that some companies find unacceptable, and that can result in a product that does not stand stretching or repeated home and industrial laundering. Consequently, embroidery has instead become the primary method for applying decoration and identification in the industry.

Up until now the methods used for permanently attaching fabric to fabric or decorations to fabric have required sewing which is time consumptive and to be performed economically requires machinery and skilled operators. Another method of permanently adhering textiles to textiles is through the application of heat to activate a thermoplastic adhesive which also requires equipment. While these methods create durable washable bonding they are impractical for quickly bonding textile products together without equipment. A quick and easy method which can safely be used by consumers of all ages, including children or by industry to bond textile materials or decorations together without equipment is desired.

There have been a few attempts at providing emblems via thermal application. U.S. Pat. No. 5,009,943 to Stahl discloses a method for producing a multi-colored emblem that may be ironed-on to garments to provide an embroidered appearance. This method entails laminating a material blank, cutting the laminated material to a specific design, embroidering about the periphery of the cut design, laminating the assembly onto a second material blank, and coating the underside with a thermal adhesive layer. The emblem can then be heat-sealed to a garment. Despite the ability to give a realistic embroidered look, thermally-bonded emblems still require additional processing steps and equipment to heat the emblem at application. In addition, thermal transfers typically have a greater rigidity or stiffness compared to the product to which they are being adhered. When applied, such emblems can decrease the comfort to the wearer of an apparel garment and change the drape characteristics of the product making it less visually appealing.

The apparel industry is gravitating toward quick-change low-inventory production, but the labor, inventory, and other costs associated with the foregoing techniques make them relatively slow and expensive. Consequently, embroiderers and other apparel customizers using these techniques typically require substantial minimum-quantity orders, and bulk orders are only justified where economics warrant the expenditure associated with sewn-in decorations or heat-sealing them onto products. Apparel manufacturers would much prefer to customize articles in small batches in order to keep turnaround time and inventory at a minimum. For smaller quantity orders, however, sewing and heat-sealing decorations onto apparel, home furnishings or luggage is costly and time consuming and often requires specialized equipment and skilled operators. Individual consumers attempting to bond textile products including emblems, badges, indicia and other forms of textile embellishments, together must set-up to sew these items by hand or with a machine requiring at a minimum a needle and thread or use a home iron to activate a thermal adhesive for that purpose. These steps make the application location and equipment dependent and cause safety concerns if children participate in the process. Thus customization and personalization of textile products by consumers is limited by equipment, location and safety concerns. In a commercial environment industrial sewing equipment or heat presses would be necessary to set up and operate in production to decorate textile based items. In addition, the manufacture of heat applied bonding such as seams, appliques and emblems requires special equipment to apply the adhesive to the base layer. Much of the production overhead required with the foregoing processes could be avoided with a room temperature transfer pressure sensitive adhesive fabric, applique or applied emblem. However, there have been comparatively few attempts to provide room temperature transfer emblems because the bond quality has in the past not been able to withstand wear and laundering.

For example, U.S. Pat. No. 5,635,001 to Mahn, Jr. issued Jun. 3, 1997 shows cloth transfers that include a cloth layer coated with a plastic layer which is, in turn, coated with a pressure sensitive adhesive layer. The pressure sensitive layer as described is for pre-positioning a decoration prior to sewing or alternatively heat-sealing with an adhesive and is not proposed as a stand-alone method to create a permanent bond between textile products.

U.S. Patent Application 20030023018 by Nakano et al. issued Jan. 30, 2003 shows an acrylic pressure-sensitive adhesive which has a weight average molecular weight of 1,200,000 or higher and in which the proportion of components having a molecular weight of 100,000 or lower is 10% by weight or lower based on the weight of the whole polymer. This results in a uniformly-viscous acrylic adhesive less apt to foul an extruder. The adhesive claimed here is targeted for application in tapes, labels and sheets with no mention of textile-to-textile applications or launder ability.

U.S. Pat. No. 6,582,791 to Peloquin et al. issued Jun. 24, 2003 shows a pressure sensitive adhesives for use on low energy surfaces designed to achieve high or permanent adhesion. This patent suggests the addition of various additives to an acrylic base polymer such as a tackifier, for better adhesion of vinyl film to low surface energy substrates and makes no claims related to textile to textile application or launder ability.

U.S. Pat. No. 6,753,050 to Dalvey et al. issued Jun. 22, 2004 shows a cold image transfer sheet for T-shirts including an image imparting layer and an adhesive layer. The adhesive layer permits transfer of an image to a substrate. The image transfer sheet comprises a base layer 12 (FIG. 1), a release layer 14 that overlays the base layer, a pressure-sensitive adhesive layer 16 (a variety are suggested including acrylic-based), and a polymer layer 18. An image or a portion of an image is imparted to one or more of the adhesive layer 16, polymer layer 18, primer layer 20 or optional second ink-receiving layer 22. The image transfer sheet described is a thin polymer film between 0.2 to 3 mils in thickness. The PSA described is non-specific and wash characteristics and launder ability are not described. The patent claim also does not address textile to textile applications.

U.S. Pat. No. 4,880,678 to Goffi issued Nov. 14, 1989 shows a dry-cold transfer sheet suited for application to wood, that comprises a colored film adhering to a backing sheet with an interposition of a layer of release varnish. The colored film included 30-40% pigment, 1-4% of cycloaliphatic epoxy resin, from 15-35% of vinyl copolymer, from 1-4% of polyethylene wax. This Dry Transfer sheet consists of a colored film for application to wood panels. Again the reference does not apply to textiles and survivability to laundering.

U.S. Pat. No. 6,951,671 to Mukherjee et al. (P. H. Glatfelter Company) issued Oct. 4, 2005 shows an ink jet printable heat transfer material with cold release properties. The invention consists of multiple layers of coatings applied to a suitable substrate, typically paper. The first optional layer coating consists typically of a pigmented coating bound together with a synthetic or natural binder and is applied in sufficient quantity to level and densify the surface of a given substrate. The second coating is applied over the first and consists of a silicone coating with a controlled surface energy. The surface energy must be such that the subsequent aqueous coatings can be applied over top with good wetting and adhesion, but low enough for an easy removal from the heat transfer after cooling. A third or wash layer is applied over the silicone release layer so the coating does not come off during subsequent coating passes and during handling by the user. The wash layer consists of one or more thermoplastic polymers including ethylene acrylic acid, waxes, and other polymers along with dispersions of non-water soluble plasticizers and antioxidants. As described heat is require to bond a composite of paper and silicone and non-water soluble plasticizers onto a substrate. Although the application here is to fabric and discusses washing it does not teach bonding one textile-based product to another, nor is it specific in the composition of the pressure sensitive adhesive and the durability of the bond to laundering.

Though sewing and stitched embroidery are avoided in all of the foregoing cases to initially bond products, the resulting products cited above are inferior in durability and cannot withstand repeated washing or require additional process steps of sewing or heat-sealing. It would be greatly advantageous to consumers and industry to provide a method for adhesively bonding textile products, appliques, emblems and other textile-based brand identification or fabrics to apparel and or accessories, headwear, crafts, home furnishings and luggage which requires no minimum quantity, no equipment, and which is less time consuming and labor intensive than affixing by sewing or heat-sealing. Importantly, the bonding can occur quickly, where this activity can be performed safely by both adults and children.

SUMMARY OF THE INVENTION

It is, therefore, an object of the present invention to provide a novel room temperature pressure sensitive adhesive capable of adhering textiles and fabrics together for purposes of seaming or permanently attaching items such as textile emblems, badges, panels, and appliqué bearing text, numbers, logos and other indicia for the apparel, accessory and other industries that serves as a sewing, direct embroidery, and thermo-application replacement.

It is another object to provide a room-temperature pressure-sensitive adhesive capable of bonding textile and fabrics or textile transfers designed with high inherent bond strength to withstand repeated laundering.

It is another object to provide a room-temperature pressure sensitive adhesive to bond textiles and fabrics or create textile transfers, appliques or emblems that can be given out at stores, meetings and ceremonies, where personalization and recognition can take place immediately and be applied on-site without any equipment requirement or safety concerns.

It is another object of the invention to provide a means to seam or apply textile decorative elements to textile based products when the latter are heat sensitive, and cannot utilize heat activated thermoplastic films where the heat required changes the characteristics of the fabric that is being applied to.

It is another object of the invention that objects such as electronic or biological sensors can be applied to textile materials where heat activated films or sewing might compromise or destroy the functionality of the sensors, or where room temperature permanent applications may support field application of the textile-based products.

It is another object to provide a room-temperature pressure sensitive adhesive or transfer article more suitable for production in smaller quantity 'on demand" orders than sewing and heat-sealing seams and or decorations onto apparel, home furnishings, luggage or crafts.

These and other objects are achieved herein by an improved adhesive for bonding textiles, a method for producing an integrated textile emblem using the adhesive, and the emblem itself formed in accordance with the present method which is capable of adhering to textile based products as well as thermal transfer articles, and yet is less time consuming and labor intensive than previous methods known in the art, thereby avoiding any need for minimum product orders. The pressure sensitive-adhesive-backed emblem described herein can be produced and applied to consumer textile based products such as apparel and accessories, crafts, home furnishings or luggage in accordance with the method described herein.

The preferred pressure sensitive adhesive is a solvent-based pressure sensitive adhesive comprising modified acrylic compounds with no cross-linking additives that is hydrophobic. Other adhesive polymers could be used if the composition provides modulus and hydrophobic properties which meet similar performance characteristics as the preferred embodiment disclosed herein. The adhesive can be adhered directly to a textile emblem having a base layer of natural or synthetic textile fibers formed into a woven, knit or nonwoven sheet that is further decorated through several possible techniques or combinations thereof including dyeing, screen printing, sublimation printing, direct digital printing, embossing, etching, engraving, flocking, jacquard weaving, stitching, embroidery or appliquéing multiple layers of materials which are then cut out into decorative shapes or patterns.

Once the adhesive has been adhered to a textile fabric, applique or emblem it forms a pressure sensitive adhesive layer with the ability to bond to a range from low to high-surface-energy textile substrates, greater than 10 dynes/cm, from waterproof tight woven and treated fabrics to twill woven polyester and poly/cotton substrates and establish a washable, sustainable bond. As used herein and throughout the appended claims, the term "washable" is intended to connote that the subject material is capable of withstanding at least 20-30 home laundering cycles without serious degradation of the bond.

In an intermediate state for transportation and storage purposes, a release liner made of coated paper or film can be attached to the underside of the pressure-sensitive adhesive layer to protect and maintain the adhesive properties of the pressure sensitive adhesive prior to the application to textile based product such as fabrics, apparel, home furnishings or luggage.

To apply a textile based fabric, applique or emblem, the fabric, applique or emblem is positioned over the textile-based target product to be decorated, and the release liner is removed. The fabric, applique or emblem is then firmly pressed against the textile based product at room temperature, thereby securely bonding the two together and creating a durable bonded product.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

The present invention is a pressure sensitive adhesive for securing textile products together, and a method of producing an integrated room temperature pressure sensitive emblem bearing text, numbers, logos or other indicia for application to apparel and accessories, as well as the emblem constructed in accordance with the production process.

The construction utilizing the pressure sensitive adhesive ensures a high inherent bond strength that withstands repeated laundering. The emblem is well-suited for application to any fabric or leather substrate, including coarser non-woven fabrics such as felt and fleece ("substrate" being herein defined as any leather or fabric, whether woven fabric or non-woven fabric, or any other flexible material used for apparel, signage, banners, pennants or similar, and "non-woven" being herein defined as any fabric substrate produced by processes other than weaving).

Figure 1:
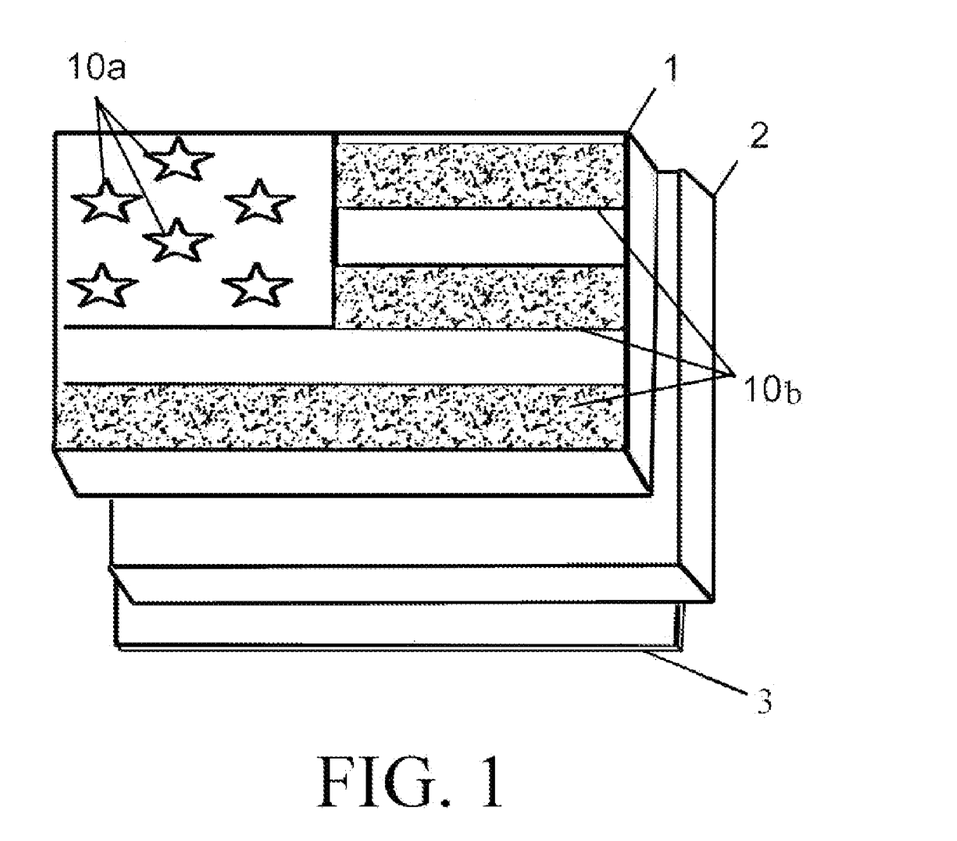
FIG. 1 is a partial top plan view of the upper portion an integrated textile emblem capable of adhering to textile based products.
Figure 2:
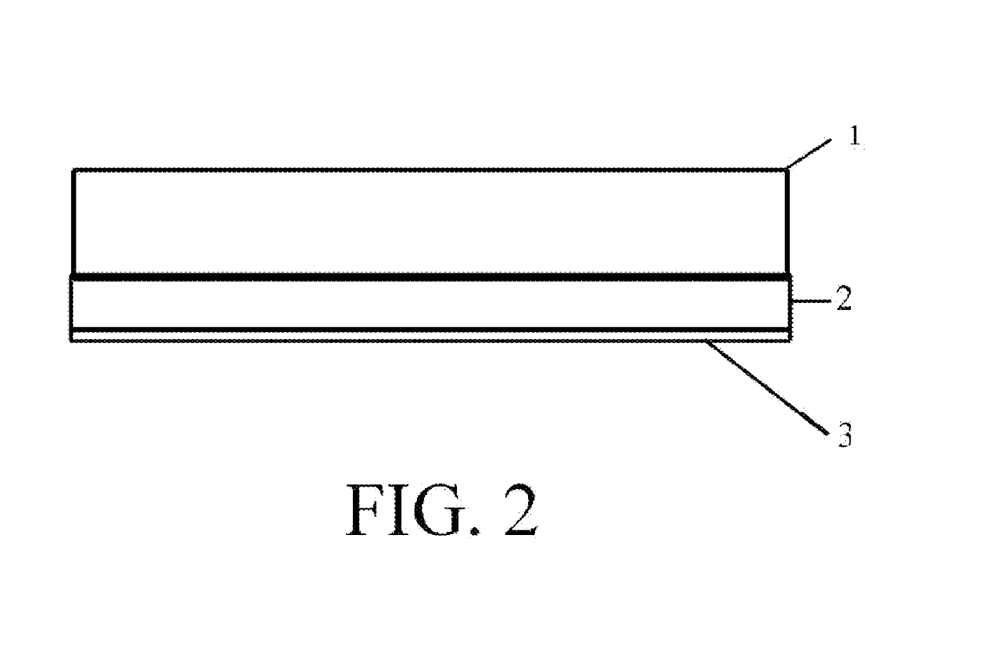
FIG. 2 is a cross sectional plan view of an integrated textile emblem capable of adhering to textile based products.

With combined reference to FIGS. 1 and 2, the multilayer emblem of the present invention generally includes a base layer (1) comprising natural or synthetic textile fibers formed in a woven, knit or nonwoven sheet, and which is decorated through several possible techniques or combinations thereof including dyeing, screen printing, sublimation printing, direct digital printing, embossing, etching, engraving, flocking, jacquard weaving, stitching, embroidery. In addition, the base layer (1) may comprise multiple appliquéd layers of materials cut out and adhered into decorative shapes or patterns, such as stars (10a) and stripes (10b). A pressure-sensitive acrylic adhesive layer (2) is then laminated to the bottom of the base layer (1). The preferred pressure sensitive adhesive (PSA) layer (2) comprises a solvent-based acrylic adhesive including a modified acrylic-based polymer hydrophobic adhesive composed primarily of relatively hydrophobic low Tg acrylate monomers such as 2-ethylhexyl acrylate, and specifically avoiding the incorporation of relatively hydrophillic monomers such as vinyl acetate. The inventive compound is preferably without cross-linkers; though minimum amounts of cross linkers maybe possible in some compounds that would match the performance characteristics claimed. PSAs in general are viscoelastic, meaning part elastic (bounce back into shape) and part viscous (flowing). The storage and loss modulus in viscoelastic materials measures the stored energy, representing the elastic portion, and the energy dissipated as heat, representing the viscous portion. In the present invention the preferred adhesive has a storage modulus at room temperature of between $1.88 \times 10^4$ Pa at 0.1885 Hz to $5.25 \times 10^5$ Pa at 628 Hz with a loss modulus of between $1.29 \times 10^4$ Pa at 0.1885 Hz to $5.08 \times 10^5$ at 628 Hz and a Damping Factor between 0.685 at 0.1885 Hz to 0.966 at 628 Hz measured on films 20 mil thick and at 5% strain. Within the Pressure Sensitive Adhesive Industry, it is generally assumed that stronger more durable bonds are achieved through addition of crosslinking agents which raise the average molecular weight and increase the Storage Modulus. This is because conventional wisdom teaches away from the principle that survivability in wash utilizing PSAs is best obtained by creating an adhesive which is more flexible and pliable through the cycle (oscillations) of materials and the temperature range of washing and drying. The present invention accomplishes the foregoing with an acrylic copolymer adhesive having a storage modulus that is greater than the loss modulus through the frequency range 0.1885 Hz to 628 Hz where bonding and debonding are expected to occur.

Figure 3:
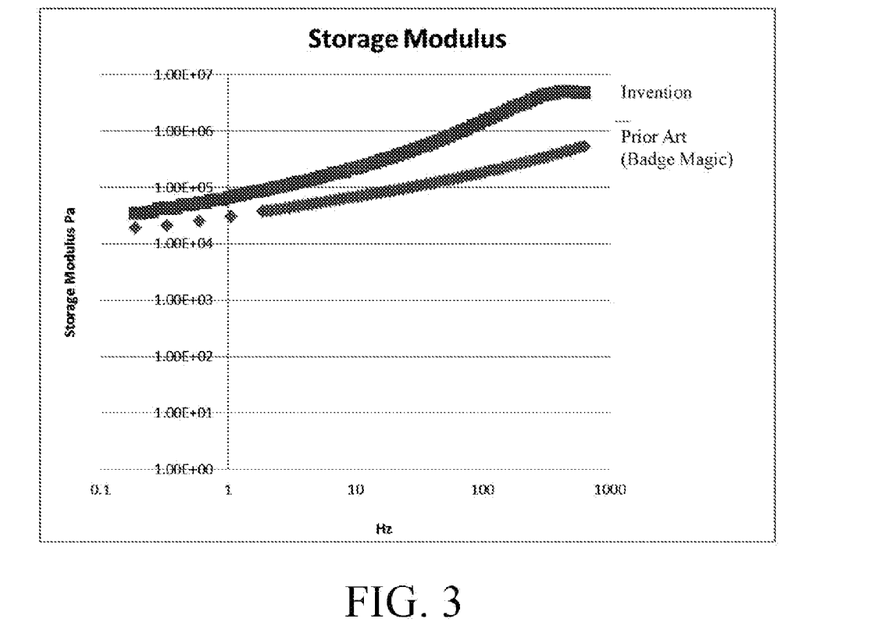
FIG. 3 is a graph of the storage modulus [Pa] of the present invention as a function of frequency (Hz).

FIG. 3 is a graph of the storage modulus [Pa] of the present invention as a function of frequency (Hz), plotted along with that of an adhesive of a prior art PSA called Badge Magic™.

Figure 4:
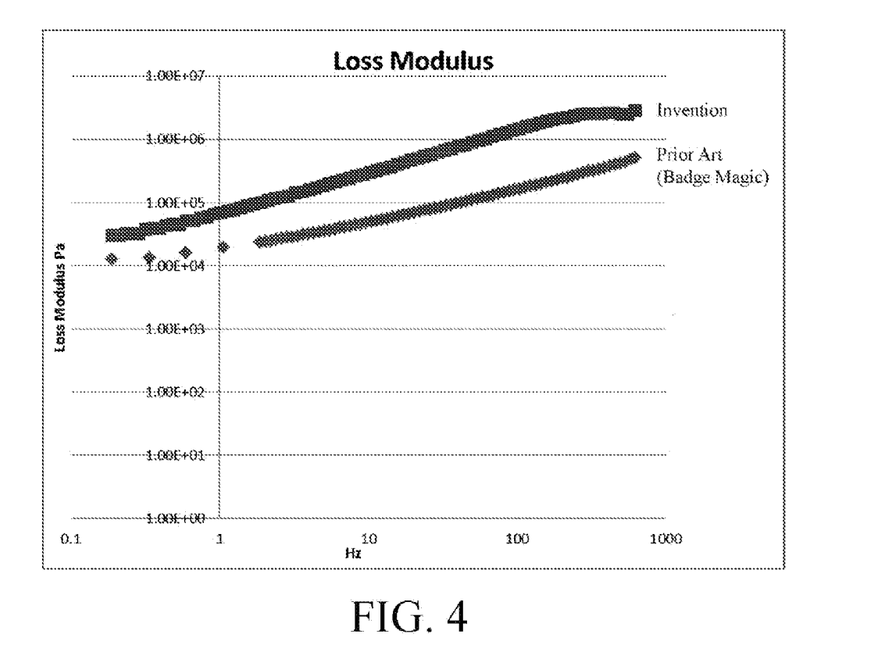
FIG. 4 is a graph of the loss modulus [Pa] of the present invention as a function of frequency (Hz).

FIG. 4 is a graph of the loss modulus [Pa] of the present invention as a function of frequency (Hz), again along with Badge Magic™. It can be seen that the storage modulus (FIG. 3) at room temperature is between $1.88 \times 10^4$ Pa at 0.1885 Hz to $5.25 \times 10^5$ Pa at 628 Hz, while the loss modulus is between $1.29 \times 10^4$ Pa at 0.1885 Hz to $5.08 \times 10^5$ at 628 Hz (FIG. 4) remains greater than the loss modulus through the entire critical frequency range 0.1885-628 Hz where bonding and debonding are expected to occur. In contrast, the Badge Magic™ PSA storage modulus (FIG. 3) at room temperature starts out greater than the loss modulus but at about 100 Hz this reverses as the loss modulus of the modified acrylic copolymer used in Badge Magic™, which has cross-linking agents, rises more quickly.

Figure 5:
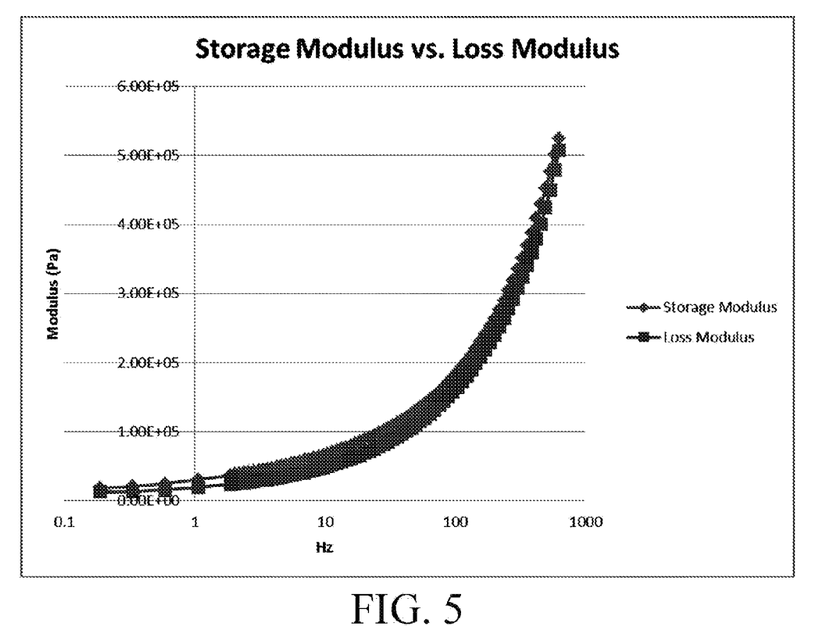
FIG. 5 is a graph of the storage modulus versus the loss modulus of the present invention.

FIG. 5 is a graph of the storage modulus versus the loss modulus of the present invention. Again is can be seen that the storage modulus is greater than the loss modulus through the critical cycle range where bonding and debonding are expected to occur.

Figure 6:
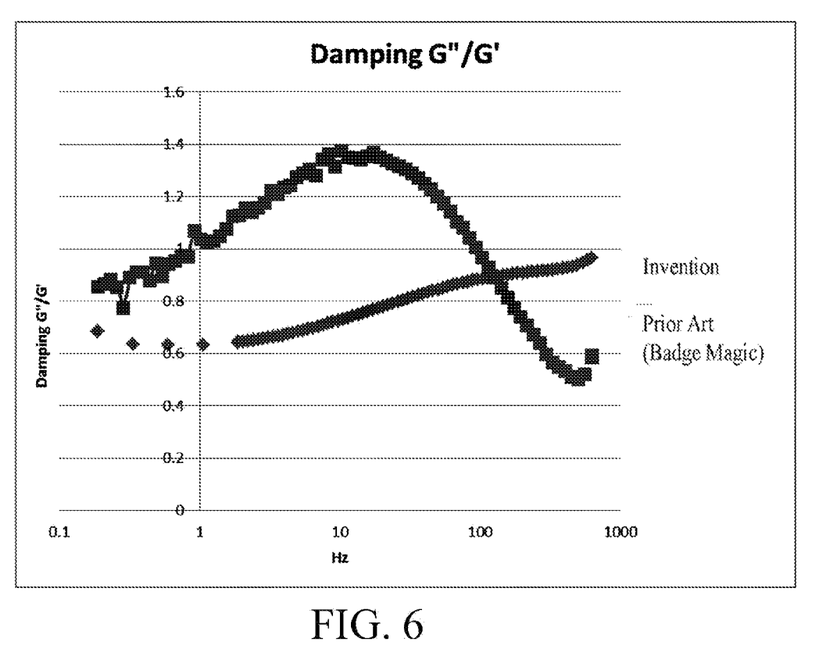
FIG. 6 is graph of the damping factor [G"/G'] of the present invention.

FIG. 6 is graph of the damping factor [G"/G'] of the present invention, which represents the rate at which the adhesive dissipates energy as a function of frequency. The higher the damping (dissipation), the higher the rate of energy dissipation. Dissipation in the present invention is between 0.685 at 0.1885 Hz to 0.966 at 628 Hz, and rises at a constant rate, whereas the modified acrylic adhesive used in Badge Magic™ is a bell curve.

The foregoing characteristics, in combination, yield an aggressive water-resistant type pressure sensitive adhesive layer (2) that provides an immediate tack to fabric materials upon applying pressure thereto, and which possesses stretch and recovery characteristics in order to survive the stresses created at the bonded interface caused by repeated washing and drying cycles. The present adhesive is water-resistant and capable of withstanding repeated wash cycles (at least 20-30 home laundering cycles). It has the ability to bond to low- to high-surface-energy textile substrates such as base layer (1) and establish a washable, sustainable bond. Surface energy can equivalently be stated as surface tension measured in dynes/cm, each dyne being the force required to break a film of 1 cm length. The present adhesive has the ability to bond to surfaces including those of the textile product (4), in addition to the base layer (1), where their surface tension is 10 dynes/cm or greater. It is entirely without cross-linking additives, and even more preferably is without any cross-linking (including free-radical) at all. This is important for the following reasons.

Cross-linking agents are commonly added to a base polymer resin to increase molecular weight. However, increasing molecular weight of a polymer adhesive reduces the ability of the adhesive to flow and absorb and dissipate the stresses such as those encountered in washing adhesively bonded fabrics, decreasing durability of the bond. There are two major cross-linking mechanisms for acrylic adhesives: free-radical copolymerization of multifunctional ethylenically unsaturated groups incorporated into the base polymer, and covalent or ionic cross-linking through reaction of post-added crosslinking agents with functional monomer(s) in the base polymer. For free-radical copolymerization a variety of different materials have been used as cross-linking agents, e.g., polyfunctional acrylates, acetophenones, benzophenones, triazines, etc. The foregoing cross-linking agents, however, possess certain drawbacks which include one or more of the following: high volatility; incompatibility with certain polymer systems; generation of corrosive or toxic by-products; generation of undesirable color; requirement of a separate photoactive compound to initiate the cross-linking reaction; and high sensitivity to oxygen. For covalent or ionic cross-linking, the post-added cross-linking agents are materials with pendant reactive functional groups, or multivalent metal ions. The choice of reactive group is important because it controls cross-linking density and efficiency, shelf stability and adhesion properties. In addition, crosslinker selection has a significant effect on polymer cost, flexibility and UV resistance. Contra to conventional adhesives, the present invention eliminates any cross-linking agents from the pressure sensitive adhesive layer (2), decreasing its molecular weight, thereby increasing the ability of the adhesive to flow and absorb and dissipate the stresses such as those encountered in washing adhesively bonded fabrics, decreasing durability of the bond. The bond remains more flexible and pliable through the cycle (oscillations) of materials and the temperature range of washing and drying, and vastly improves launderability.

One skilled in the art will recognize that a suitable PSA polymer could utilize some degree of crosslinkers and match the properties described; however, this level would be below the normal threshold of industry practice for creating PSAs A suitable adhesive meeting all the above-described parameters can be manufactured using the following constituents within the following acceptable ranges:

Acrylic polymer(s): 25.0-60.0%, 43% preferred, plus

A carrier within a range of from 40 to 75 weight percent.

The acrylic polymer(s) further comprises 60 to 99 percent 2-ethylhexyl acrylate, more preferably 75 to 90 percent 2-ethylhexyl acrylate, and most preferably 85 to 90 weight percent 2-ethylhexyl acrylate.

The acrylic polymer(s) also comprises within a range of from 0.5 to 6 percent of monoethylenic carboxylic acid(s) chosen from among a group consisting of acrylic acid, methacrylic acid, and itaconic acid, and even more preferably 2 to 4 percent monoethylenic carboxylic acid(s), and most preferably 3 percent monoethylenic carboxylic acid(s).

The acrylic polymer(s) also comprises within a range of from 0.5 to 39.5% methylacrylate, and even more preferably 24.5 to 2 percent methylacrylate, and most preferably 10 weight percent methylacrylate.

The preferred carrier further comprises ethyl acetate within a range if from 44.0-46.0%, 45% being preferred, plus isopropyl alcohol within a range of from 10.0-12.0%, 11% being preferred.

Once skilled in the art should understand that the foregoing carrier of ethyl acetate and isopropyl alcohol evaporates and so is not present in the finished article. Again, in direct contrast to most conventional PSAs which add an amount of cross-linker for improved cohesion, water resistance, solvent resistance, hardness, durability and weatherability, the present application eliminates any cross-linking agent. Cross-linking functionality tends to lower tack and initial peel values, thus reducing the strength and suitability of the adhesive composition for the present application. Consequently, an elimination of any cross-linking agent results in a product that is better able to form high initial bonds and withstand repeated stretching.

The pressure-adhesive layer (2) bonds itself to the decorative base layer (1) and to the target product to be decorated or bonded, which may be any textile based product such as apparel, home furnishings or luggage including fabric or substrates as defined above.

Figure 7:
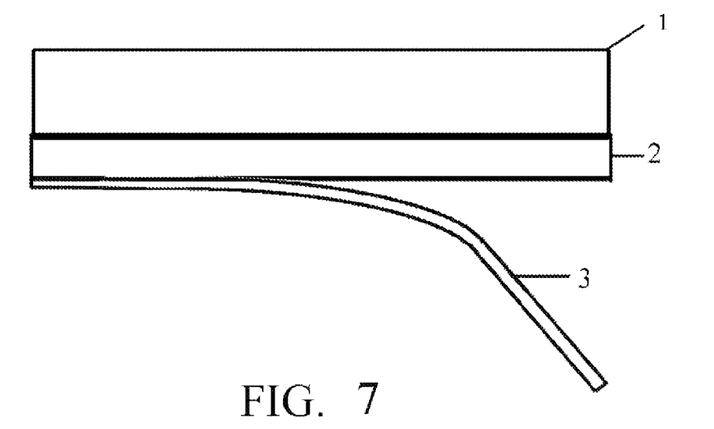
FIG. 7 is a cross sectional plan view of an integrated textile emblem capable of adhering to textile based products depicting the removal of the release paper or film from the product.

Referring back to FIGS. 1-2, after pressure-sensitive acrylic adhesive layer (2) is laminated to the bottom of the base layer (1), a release liner (3) is adhered beneath the pressure-sensitive adhesive layer (2). The release liner (3) may be any suitable release-coated paper or film to protect and maintain the adhesive properties of the pressure sensitive adhesive layer (2) prior to application of the emblem to the target product. As shown in FIG. 7, the release liner (3) is simply peeled away and discarded prior to application of the fabric, applique or emblem to a target product.

In accordance with the production process according to the present invention, the base layer (1) is bonded mechanically on the bottom, side opposite the decorated top of the base layer (1), to the pressure-sensitive adhesive layer (2). The release liner (3) is then adhered to the underside of the pressure-sensitive adhesive layer (2).

Figure 8:
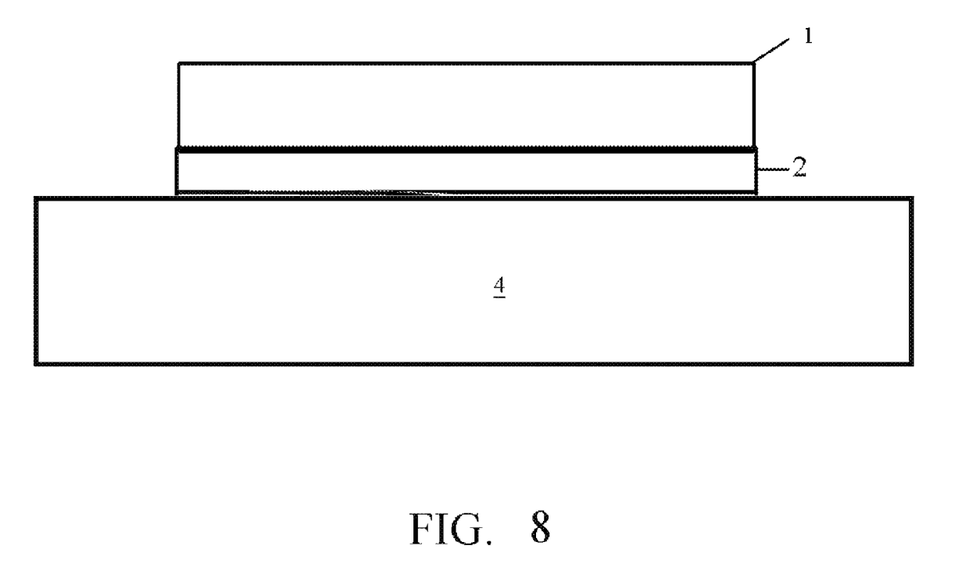
FIG. 8 is a cross sectional plan view of an integrated textile emblem adhered to the top surface of a textile based product.

To apply the integrated textile fabric, applique or emblem, the release liner (3) is removed as seen in FIG. 7, and the emblem is positioned over the consumer textile product (4), as shown in FIG. 8. Given proper positioning, the textile emblem may be firmly pressed against the consumer textile product (4), as shown in FIG. 8, thereby securely bonding the two together and essentially creating a "decorated" embellishment on the surface of the consumer textile product (4). Thus, with relative ease, apparel, headwear, home furnishings, luggage or craft can be decorated with a variety of embellishments.

The foregoing adhesive and emblem and process are especially suitable for use in decorating small quantities of garments, as well as large quantities. For smaller orders, the above process can be implemented by hand, but if the quantity of the order warrants, it is contemplated that auto-handling equipment (not shown) similar to label application techniques could be used to implement the process of applying pressure to affix the emblems. In either case, the above process eliminates the cost prohibitive and labor intensive sewing or heat-sealing operations required for affixing conventional embellishments. Decorators may now mass produce their textile products and use a variety of embellishments on multiple job orders and for many different products. This also creates the ability to immediately affix decorations in stores or at events creating immediate satisfaction of a customer or award recipient.

The foregoing adhesive is especially suited for consumer use and even use by children for personalizing and customizing textile based products such as apparel, headwear, home furnishings and crafts. Since no equipment needles or heat are required the simplicity of application would be greatly desired.

It will, of course, be understood that various changes may be made in the form, details, arrangement and proportions of the parts without departing from the scope of the invention which comprises the matter shown and described herein and set forth in the appended claims.

We claim:

1. A method of wash-durably bonding a textile emblem to a textile article, comprising the steps of:
   providing a textile emblem having a back surface;
   a first laminating step of laminating a pressure sensitive acrylic polymer adhesive to the back surface of said textile emblem, said acrylic polymer adhesive further comprising a base resin and a solvent, said base resin further consisting essentially of 2-ethylhexyl acrylate-methacrylate suitable for covalent or ionic post-cross-linking, said arylic polymer adhesive having a storage modulus that is greater than a loss modulus throughout a frequency range of from 0.1885 Hz to 628 Hz where bonding and debonding are expected to occur, and being devoid of any cross linking reagent;
   a second laminating step of laminating a release liner to said pressure sensitive acrylic polymer adhesive;
   removing said release liner;
   placing said textile emblem against a textile article with said laminated pressure sensitive acrylic polymer adhesive adjacent to the surface of said textile article; and
   applying pressure to said textile emblem at room temperature whereby said emblem is wash durably bonded to said article.

2. The method of wash durably bonding a textile emblem to a textile article according to claim 1, wherein said first laminating step further comprises laminating a solvent-based pressure sensitive acrylic polymer adhesive having a storage modulus of between $1.8 \times 10^4$ Pa to $5.3 \times 10^5$ Pa at room temperature and 5% strain and a loss modulus of between $1.29 \times 10^4$ Pa and $5.08 \times 10^5$ Pa. throughout a frequency range of 0.1185 Hz to 628 Hz.

3. The method of wash durably bonding a textile emblem to a textile article according to claim 2, wherein said first laminating step further comprises laminating a solvent-based hydrophic pressure sensitive acrylic adhesive to the back surface of said textile emblem.

4. The method of wash durably bonding a textile emblem to a textile article according to claim 2, wherein said acrylic pressure sensitive adhesive comprises a mixture of acrylic polymer, ethyl acetate, and isopropyl alcohol.

5. The method of wash durably bonding a textile emblem to a textile article according to claim 4, wherein said acrylic pressure sensitive adhesive comprises a mixture of acrylic polymer within a range of from 25.0-60.0 weight %, and a carrier within a range of from 40-75%.

6. The method of wash durably bonding a textile emblem to a textile article according to claim 5, wherein said carrier further comprises ethyl acetate within a range if from 44.0-46.0%, and isopropyl alcohol within a range of from 10.0-12.0%.

7. The method of wash durably bonding a textile emblem to a textile article according to claim 6, wherein said carrier further comprises 45% by weight ethyl acetate and 11% by weight isopropyl alcohol.

8. The method of wash durably bonding a textile emblem to a textile article according to claim 7, wherein said acrylic pressure sensitive adhesive comprises a mixture of acrylic polymer of 43 weight %, ethyl acetate of 45 weight %, and isopropyl alcohol of 11 weight %.

9. The method of wash durably bonding a textile emblem to a textile article according to claim 5, wherein said acrylic pressure sensitive adhesive comprises a mixture of acrylic polymer of 43 weight %, ethyl acetate of 45 weight %, and isopropyl alcohol of 11 weight %.

10. The method of wash durably bonding a textile emblem to a textile article according to claim 1, wherein said acrylic pressure sensitive adhesive consists of a mixture of acrylic polymer, ethyl acetate, and isopropyl alcohol.

11. The method of wash durably bonding a textile emblem to a textile article according to claim 10, wherein said acrylic pressure sensitive adhesive consists of a mixture of acrylic polymer within a range of from 25.0-60.0 weight %, ethyl acetate within a range of from 44.0-46.0 weight %, and isopropyl alcohol within a range of from 10.0-12.0% weight %.

12. The method of wash durably bonding a textile emblem to a textile article according to claim 11, wherein said acrylic polymer further comprises approximately 87% 2-ethylhexylacrylate.

13. The method of wash durably bonding a textile emblem to a textile article according to claim 12, wherein said acrylic polymer further comprises within a range of from 0.5 to 6 percent monoethylenic carboxylic acid(s) chosen from among a group consisting of acrylic acid, methacrylic acid, and itaconic acid.

14. The method of wash durably bonding a textile emblem to a textile article according to claim 13, wherein said acrylic polymer is a poly(co-2-ethylhexyl acrylate-methacrylate) base resin suitable for covalent or ionic post-cross-linking.

15. The method of wash durably bonding a textile emblem to a textile article according to claim 1, wherein said pressure sensitive acrylic polymer adhesive is solvent-based and has an average molecular weight of 100,000.

16. The method of wash durably bonding a textile emblem to a textile article according to claim 1, further comprising a step of said textile emblem remaining adhered to said textile article through a range of at least 20 wash cycles.

* * * * *